Aug. 11, 1942.                B. V. ORRE                2,292,401
                    PULSATOR FOR MILKING MACHINES
                         Filed May 20, 1939
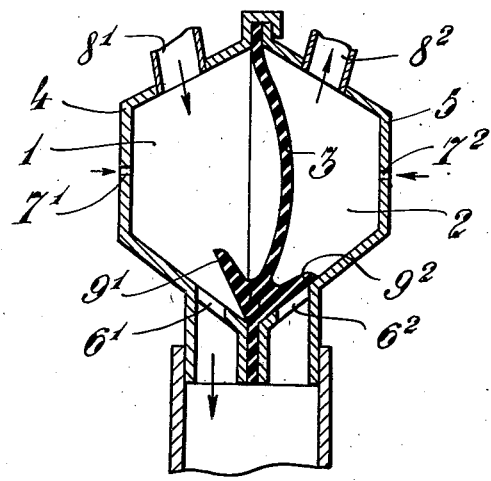
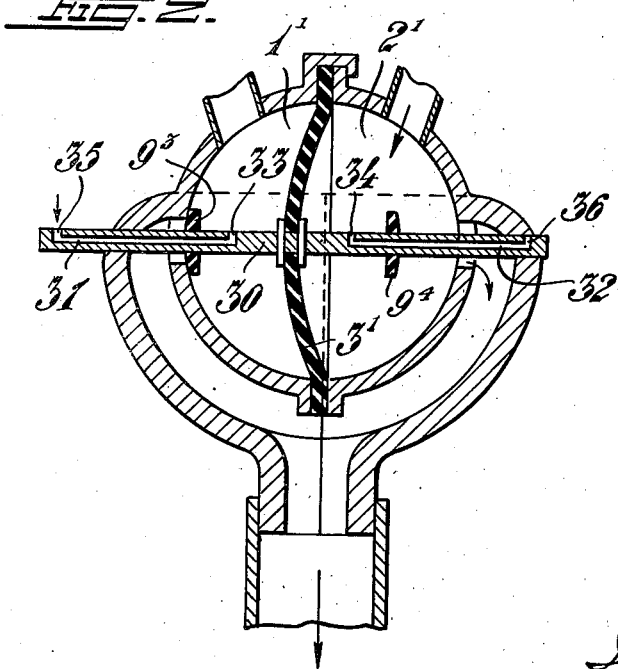

Patented Aug. 11, 1942

2,292,401

UNITED STATES PATENT OFFICE 2,292,401

PULSATOR FOR MILKING MACHINES

Berndt Victor Orre, Stocksund, near Stockholm, Sweden

Application May 20, 1939, Serial No. 274,798
In Sweden May 30, 1938

6 Claims. (Cl. 31—61)

For effecting the changes of pressure in the teat cups of milking machines it is common practice to use a so called pulsator, that is to say, an apparatus operating under the influence of atmospheric pressure on the one hand and a constant or approximately constant vacuum on the other hand. The hitherto used types of such apparatus are, as a rule, very complicated, comprising a great number of elements which renders the apparatus easily subjected to interruptions of service.

The present invention has for its object to provide a pulsator comprising only a small number of simple elements. The pulsator according to the invention consists, essentially, of a housing and a diaphragm dividing the housing into two separate working chambers, which is so constructed and arranged as to be capable of occupying, when at rest, either of two extreme positions only situated on opposite sides of the clamping plane of the diaphragm. In each of said extreme positions the diaphragm covers an outlet to a vacuum from one working chamber and uncovers a corresponding outlet from the other working chamber.

In the accompanying drawing two embodiments of the invention are illustrated. Fig. 1 is a vertical section of one embodiment and Fig. 2 is a vertical section of the other embodiment.

In the embodiment shown in Fig. 1, the interior of a hexagonal housing, comprising two halves 4 and 5, is divided by a diaphragm 3 into two separate chambers 1 and 2, the diaphragm 3 being clamped at its periphery between the two halves 4, 5 forming the wall of the housing. Each of said halves is formed with three ports. One of these ports, $6^1$ and $6^2$, respectively, leads to a constant sub-atmospheric pressure, for instance, the vacuum prevailing in the bucket of a milking machine, another port, $7^1$ or $7^2$, leads to the atmosphere and the third port, $8^1$ or $8^2$, leads to the teat cups of the milking machine. The diaphragm 3 is elastic and may either be cup-shaped or of such a size as compared with the circumference of the halves 4, 5 of the housing, as to be caused to bulge to the one side or the other. The diaphragm 3 is provided with two projections $9^1$ and $9^2$, respectively, enclosing between themselves an angle somewhat less than the angle between the adjacent wall portions of the housing. In the position of the diaphragm 3 shown in Fig. 1 the projection $9^2$ covers the port $6^2$. Through the port $6^1$ which at the same is open, the chamber 1 is evacuated and through the port $8^1$ the teat cups in communication with the chamber 1 are evacuated too. The ports $7^1$ and $7^2$ leading to the atmosphere are very narrow as compared with the other ports. Thus, the air of atmospheric pressure entering through the aperture $7^1$ cannot appreciably affect the vacuum prevailing in the chamber 1 as well as in the teat cup connected therewith which is maintained practically unchanged through port $6^1$. The chamber 2 and the teat cups connected therewith through port $8^2$, on the contrary, represent a volume closed with relation to the vacuum. The flow of the air is indicated by arrows.

As air of atmospheric pressure enters the chamber 2 through the narrow port $7^2$, the diaphragm 3 is pressed to the left, so as to bulge towards the chamber 1, the higher pressure on the upper surface of the projection $9^2$ still keeping said projection pressed against the mouth of the port $6^2$. Only after the tension of the diaphragm slightly bulged to the left, aided by the increasing pressure in the chamber 2, becomes so high as to be capable of shifting the diaphragm to its extreme left position, that is to say, into a left position corresponding to the extreme right position shown in the drawing, will the projection $9^2$ be lifted from the opening $6^2$. During this operation both of the ports $6^1$ and $6^2$ will be held uncovered for a very short moment, but on the one hand, this moment is too short to allow the chamber 2 to be evacuated to a degree like that of the chamber 1 and, on the other hand, the diaphragm 3 having passed its central position, immediately tends to move by its own tension into its new extreme position, that is to say, in the case under consideration, to the left. When the diaphragm reaches its extreme left position, the projection $9^1$ covers the port $6^1$. The port $6^2$ being at the same time uncovered, allows the evacuation of the chamber 2 and the teat cups connected therewith through the port $8^2$, and the cycle of operations just described will be repeated, though in the reverse order, until the diaphragm 3 again moves from the left to the right. The frequency of operation is determined by the calibration of the air apertures $7^1$ and $7^2$.

It is further to be noted that the location of the various ports for the atmospheric air, the vacuum and the teat cup connections, may be different from that shown in the drawing. The air apertures need not be formed in the pulsator proper but may be formed in the teat cups connected to the pulsator. Yet, however, it is essential that the vacuum ports ($6^1$ and $6^2$) should be so positioned with relation to the valve projections ($9^1$ and $9^2$) of the diaphragm as to allow said projections to alternately cover and uncover the ports, as stated above. In addition, it is essential that the angle between the projections $9^1$ and $9^2$ should not be so large as to allow the ports $6^1$ and $6^2$ to be covered simultaneously, nor so small as to allow both of said ports to be held uncovered for a sufficient time to permit a pressure equalization in the working chambers 1 and 2.

A modified embodiment is shown in Fig. 2. In this case the valve projections $9^3$ and $9^4$ are not formed integrally with the diaphragm $3^1$ but are connected thereto by means of a rod 30. This rod is formed with longitudinally extending channels 31 and 32, respectively, at its ends which are connected to the working chambers $1^1$ and $2^1$ by radial openings 33 and 34 respectively. Each of two other, likewise radial, openings 35 and 36 at the outer ends of the channels 31, 32 connects its respective chamber $1^1$ or $2^1$ with the atmosphere when the respective end of the rod projects outside the housing of the pulsator (as shown to the left of Fig. 2) but is out of communication therewith when the respective end of the rod is withdrawn (as shown to the right of the figure). Thus, the atmospheric air can only enter the one of the two working chambers which is not under evacuation.

In both figures the movements of the diaphragm, for the sake of clearness, are shown greater than they actually are.

What I claim is:

1. A pulsator for milking machines comprising walls forming a housing, a diaphragm clamped in said housing as a partition therein dividing the housing into two separate working chambers, said walls being provided with a restricted air inlet port on each side of said diaphragm opening directly into said chambers regardless of the position of said diaphragm, the walls of each chamber being provided with an individual outlet to a source of vacuum, the diaphragm being so dimensioned as to normally occupy either of two extreme positions on opposite sides of the clamping plane of the diaphragm, in each of which positions the diaphragm is bulged to cup-shape, said diaphragm being provided with a pair of integral valves one on each side thereof in position to cooperate with the respective vacuum outlets in the housing walls, said valves extending from the diaphragm less than the distance of the said outlets from the diaphragm when the diaphragm is in its central position whereby the closing of the outlets is delayed until after the diaphragm has passed through its central position and the closing action is abrupt and complete.

2. A pulsator for milking machines comprising walls forming a housing, a diaphragm extending across said housing so as to divide the interior thereof into two separate working chambers, said walls being provided with a restricted air inlet port on each side of said diaphragm opening directly into said chambers regardless of the position of said diaphragm, the walls of each chamber being provided with an individual outlet to a source of vacuum, the diaphragm being so dimensioned as to automatically bulge to either side when inserted into the housing, and a pair of valves formed integrally with the diaphragm extending laterally from the diaphragm adjacent the vacuum outlets less than the distance from the diaphragm clamping plane to said outlets.

3. A pulsator for milking machines comprising a housing, a diaphragm inserted in said housing so as to divide the interior thereof into two separate working chambers, each of which is provided with an outlet to a vacuum, a port to be connected with a consumption point and a narrow opening leading to the atmosphere, the diaphragm being so dimensioned as to normally occupy either of two extreme positions on opposite sides of the clamping plane of the diaphragm, in each of which the diaphragm is bulged to cup-shape, the diaphragm being provided with a pair of laterally projecting valves formed integrally therewith for controlling said outlets in such a way as to cover one of them in each extreme position of the diaphragm, the extent of lateral projection of said valves from the diaphragm being less than the distance from the clamping plane to the outlet port so that when the diaphragm changes position from one side to the other, one outlet is opened before the diaphragm reaches the clamping plane and the other outlet is closed after the diaphragm has passed through said plane.

4. A pulsator for milking machines comprising a housing, a diaphragm dividing the housing into only two separate working chambers, said diaphragm being so dimensioned as, when clamped into the housing, to be forced to occupy, when at rest, either of two extreme bulged-out positions on opposite sides of the clamping plane and having its highest, radial compression in the clamping plane, the diaphragm being provided with a pair of valves, one on each side thereof and eccentrically placed in regard to the diaphragm, thus having a delayed action and a shorter movement as compared with the center of the diaphragm, the wall of each working chamber having a port opening to a source of constant sub-atmospheric pressure adjacent the respective valve of the diaphragm, and each chamber wall having a constricted air port opening to the atmosphere allowing limited leakage of air into said chambers at all times.

5. A pulsator for milking machines comprising walls forming a housing, a diaphragm dividing said housing into only two working chambers, each of which is provided with an outlet to a constant source of vacuum, a port connected with a consumption point and a restricted opening to the atmosphere, said diaphragm being so dimensioned as, when clamped in the housing as a division thereof, to be concentrically compressed in the clamping plane and to tend to occupy either of two extreme bulged-out positions on opposite sides of the clamping plane, a single valve on each side of the diaphragm, formed integrally with the diaphragm and placed eccentrically in regard to the diaphragm, thus admitting of a free and unhindered motion of the central area of the diaphragm, and adjacent to the corresponding vacuum outlet, the extent of lateral projection of said valves from the diaphragm being less than the distance from the clamping plane to the outlet ports so that while the valve on the convex side of the diaphragm is pressed against the respective outlet, there is a comparatively wide gap between the valve on the concave side of the diaphragm and the respective outlet to be engaged by it.

6. A pulsator for milking machines comprising walls forming a housing, a diaphragm inserted in said housing so as to divide the interior thereof into two separate working chambers, each of which is provided with an outlet to a vacuum, a port connected with a consumption point and a narrow opening leading to the atmosphere, the diaphragm being elastic and so dimensioned, in comparison with the area of the clamping plane, as to normally occupy either of two extreme positions on opposite sides of the clamping plane of the diaphragm, in each of which the diaphragm is bulged to cup-shape, the diaphragm being provided with a pair of laterally projecting valves formed integrally therewith and likewise elastic, the valves being placed in regard to the diaphragm close to its circumference, the faces of said valves being angularly disposed with reference to the clamping plane, the vacuum outlets being placed adjacent to the valves and at a larger angle from the clamping plane, whereby one outlet only will remain closed while the center of the diaphragm moves from its extreme end position until just past the clamping plane.

BERNDT VICTOR ORRE.